United States Patent [19]

Thise

[11] Patent Number: 5,284,898
[45] Date of Patent: Feb. 8, 1994

[54] TIRE WITH NATURAL RUBBER BASED TREAD

[75] Inventor: Ghislain A. L. Thise, Wardin, Belgium

[73] Assignee: The Goodyear Tire & Rubber Company, Akron, Ohio

[21] Appl. No.: 955,792

[22] Filed: Oct. 2, 1992

[51] Int. Cl.$^5$ ............................................. C08K 3/04
[52] U.S. Cl. ...................................... 524/495; 524/496
[58] Field of Search ................................ 524/495, 496

[56] References Cited

U.S. PATENT DOCUMENTS 4,433,094  2/1984  Ogawa et al. ......................... 524/496
4,644,988  2/1987  Ahmad et al. ........................ 524/496

OTHER PUBLICATIONS

"Carbon Blacks for Rubber Applications", Cabot Corporation, North American Rubber Black Division, Atlanta, (Mar. 1989).

Primary Examiner—Paul R. Michl
Assistant Examiner—Edward Cain
Attorney, Agent, or Firm—Henry C. Young, Jr.

[57] ABSTRACT

Pneumatic rubber tire with a rubber tread composition of styrene/butadiene copolymer rubber derived from solution polymerization, cis 1,4-polyisoprene natural rubber and cis 1,4-polybutadiene rubber with a required carbon black.

1 Claim, No Drawings

TIRE WITH NATURAL RUBBER BASED TREAD

FIELD

This invention relates to a pneumatic rubber tire having a rubber tread of a specified rubber composition.

BACKGROUND

Pneumatic rubber tires are conventionally prepared with a rubber tread. Such tread is often composed of a blend of various rubbers.

In one aspect, truck tires, which are normally expected to be capable of carrying relatively large vehicular loads, tend to generate a greater integral temperature than comparable passenger vehicle-type tires. Accordingly, it is desired to provide truck tires which generate less heat under an operational load since higher tire running temperatures tend to prematurely age the tire rubber and, thus, shorten the effective life of the tire.

In another aspect, it is desired to provide a rubber tire tread, suitable for use on various truck vehicles, which generate less heat under operational conditions, yet also have good treadwear and wet traction (skid resistance).

It is recognized that tires have been prepared having treads based on various rubber blends of two or more rubbers, such as, for example, from two or more of styrene/butadiene copolymers (SBR), cis 1,4-polyisoprene including natural rubber, cis 1,4-polybutadiene and styrene/isoprene/butadiene terpolymers.

Tires have been taught, for example, which have a tread composed of natural rubber, a tread composed of a dual blend of SBR and cis 1,4-polybutadiene; of natural rubber and SBR (see The Vanderbilt Rubber Handbook, 13th Edition (1990) pp 603 and 604) and treads composed of tri-blends such as SBR (40-60 phr) with 30-35 percent styrene, cis 1,4-polyisoprene (20-30 phr) and cis 1,4-polybutadiene (20-30 phr).

It is to be appreciated that truck tires are often composed of natural rubber or a blend of rubbers which requires the presence of natural rubber. The natural rubber presence is usually desired to add heat durability for the tire tread.

It is recognized that various carbon blacks have been used for the reinforcement of rubber in rubber treads for truck tires which are based on natural rubber. However, for such applications, it is believed that carbon blacks characterized by having dibutylphthalate numbers of less than 130, usually less than 120, and with an ASTM series designation of N200 or above (see The Vanderbilt Rubber Handbook, Rubber Handbook, 1978 edition, pp. 414-418 for carbon black descriptions) are suitable.

DISCLOSURE AND PRACTICE OF THE INVENTION

In accordance with this invention, a pneumatic rubber tire is provided having a rubber tread where said tread rubber is comprised of, based on 100 parts by weight of the tread rubber, (1) about 20 to about 60 parts by weight styrene/butadiene copolymer rubber derived from organic solvent solution polymerization (S-SBR) and having a styrene content of about 15 to about 25 percent and having a vinyl content of less than 15% based on its butadiene component; (2) about 20 to about 60 parts by weight cis 1,4-polyisoprene natural rubber; (3) about 20 to about 30 parts by weight cis 1,4-polybutadiene rubber; wherein the rubber blend is also required to contain about 45 to about 55 phr of a high structure carbon black characterized by having a dibutylphthalate value (DBP) in a range of about 120 to about 140 according to ASTM D2414 and an iodine adsorption number in a range of about 120 to about 160 according to ASTM D1510.

Thus, in this invention the tire tread, designer for a truck tire tread, is composed of a tri-blend of specified rubbers which are required to be of natural rubber and two synthetic rubbers and, further, to contain a specified carbon black.

The term "phr" means parts by weight (of a referenced material) per 100 parts by weight rubber and is a recognized term by those having skill in the rubber compounding art.

An S-SBR derived from organic solvent solution polymerization is required in the practice of this invention. This is in preference to (instead of) an aqueous emulsion polymerization derived SBR (E-SBR) because the microstructure of the polymer chains of the S-SBR can be better controlled to balance its properties. More specifically, the S-SBR properties for this application differ from conventional E-SBR properties by having a higher cis 1,4-content and a lower vinyl content.

The styrene content of the SBR is important because it contributes to and aids in determining the resilience and wet grip properties of the vulcanizate.

In other words a higher styrene content in the S-SBR (in a range of about 20% to about 25%, as compared to a range of about 15% to about 20% would be expected to be detrimental for the resilience of the vulcanizate as measured by the rebound of the vulcanizate and be expected to increase the wet grip characteristics of the vulcanizate as measured by a tangent delta value of the vulcanizate at room temperature.

The vinyl content of the butadiene component of the SBR is relatively low to maintain low hysteresis properties of the rubber blend.

The term "low hysteresis properties" means low heat build-up as determined by the Goodrich Flex Test and is, thus, important for the tire durability because it retards premature heat ageing of the rubber.

A role of the S-SBR in the tread composition is to promote good treadwear and wet skid performance for the tire. This is considered to an advantage over using E-SBR because S-SBR generate less heat than E-SBR at equal treadwear and wet skid performance.

In the practice of this invention, the high structure carbon black (with the DBP value of at least 120) is prescribed because of the low hysteresis desired of the rubber blend under tire operational conditions. The low hysteresis property for the rubber vulcanizate is required to promote a long life tire. The high structure carbon black aids in achieving the low hysteresis property because at equal specific surface area and loading high structure blocks are leading to higher vulcanizate resilience.

The high structure carbon black is characterized by dibutylphthlate adsorption value of at least 120 and preferably in a range of about 120 to about 140. The DBP value is a recognized method by those having skill in the field of carbon blacks for characterizing the structure of carbon black. Usually the term "high structure" carbon black means that the black's DBP value is at least 120.

A small particle size carbon black is also preferred as characterized by a carbon black in an ASTM designated N100 series (i.e. N100 to N199 series).

Thus, in a preferred embodiment, the carbon black has an ASTM designated number in a range of about N100 to about N199, so long as it remains characterized by the said DBP range.

A high structure carbon black is considered to be differentiated from other carbon blacks (of lower structure or of lower DBP values) because of its ability to provide a high reinforcement and a low heat build up in the vulcanizate. The high reinforcement value is reflected by the stress/strain properties of the vulcanizate and the low heat build up is determined by the rebound and Goodrich Flex testing of the vulcanizate.

A role of the high structure carbon black is to enhance the tire's treadwear and maintain the tire's low running temperature.

A role of the natural rubber (cis 1,4-polyisoprene) is to promote satisfactory tread compound tear properties as determined by a Strebler adhesion test at 100° C. for which values in a range of about 15 kn/m to about 25 kn/m are representative.

A role of the cis 1,4-polybutadiene is to increase treadwear and reduce tire running temperature.

Thus, a tire tread is provided which is composed of a cooperative rubber blend of (i) an S-SBR with a relatively low bound styrene content and low vinyl content in its butadiene component to reduce tread heat (temperature) build-up while maintaining wet traction (skid resistance); and (ii) a relatively small particle size, high structure carbon black to aid in maintaining treadwear and also reducing heat (temperature) build-up; and (iii) a cis 1,4 polybutadiene to enhance treadwear and low heat buildup.

It is readily understood by those having skill in the art that the rubber compositions of the tread would be compounded with conventional compounding ingredients such as carbon black, silica, antidegradants, processing oil, stearate acid or a zinc stearate, zinc oxide, sulfur-providing materials and accelerators therefor.

Such compounding of rubber is well known to those having skill in such art. Antidegradants are typically of the amine or phenolic type. While stearic acid is typically referred to as a rubber compounding ingredient, it may be pointed out that the ingredient itself is usually obtained from its manufacturer and used in the compounding of rubber as a mixture of organic acids primarily composed of stearic acid with a small amount at least one of oleic acid, linolenic acid and palmitolic and/or palmitic acid. The mixture may also contain very small amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, rubber processing oil such as paraffinic, napthenic and aromatic processing oils typically used in the range of about 2 to about 10 phr; waxes such as microcrystalline and paraffinic waxes typically used in a range of about 1-5 phr and often in a range of about 1 to about 3 phr; and resins, usually as tackifiers, such as, for example, synthetic hydrocarbon and natural resins typically used in a range of about 1-5 phr and often in a range of about 1 to about 3 phr. A curative might be classified as a combination of sulfur and sulfur cure accelerator(s) for the rubber compound (usually simply referred to as accelerator) or a sulfur donor/ accelerator. In a sulfur and accelerator(s) curative, the amount of sulfur used is in a range of about 0.5 to 5 phr and usually in a range of about 0.5 to about 3 phr; and the accelerator(s), often of the sulfenamide type, is (are) used in a range of about 0.5 to about 3 phr and often in a range of about 1 to about 2 phr. The term "phr" refers to parts by weight of the referenced ingredient per one hundred parts by weight of rubber in the rubber composition. Such term is commonly used in the rubber compounding art.

After mixing, the compounded rubber can be fabricated into a tire tread and cured under conditions of heat and pressure by methods well-known to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Mixtures of S-SBR, natural rubber and cis 1,4-polybutadiene rubber were prepared comprised of the rubbers, as well as a small particle size, high structure carbon black as shown in Table 1 as Experiments A-C.

Experiment D is considered a control and is comprised of, based on 100 parts by weight rubber (phr), 30 E-SBR (23% bound styrene), 50 parts natural rubber, and 20 parts cis 1,4 polybutadiene and which also contains 52.5 parts N220 carbon black.

TABLE 1

| | Parts | | | |
|---|---|---|---|---|
| Material | Exp A | Exp B | Exp C | Exp D (Control) |
| Styrene/Butadiene Rubber[1] | 20 | 25 | 30 | 30 |
| Natural Rubber[2] | 55 | 55 | 50 | 50 |
| Cis 1,4-Polybutadiene[3] | 25 | 20 | 20 | 20 |
| Carbon Black[4] | 52.5 | 52.5 | 52.5 | 52.5 |
| Processing Oil (Aromatic) | 3 | 3 | 3 | 3 |

[1]Except for the Control, an S-Styrene/butadiene copolymer rubber (S-SBR) derived from organic solvent solution polymerization having a bound styrene content of about 18%, a vinyl content based on its butadiene component of about 10% and a Tg of about −70° C. For the Control, the E-SBR had about a 23% bound styrene content, a vinyl content based on its butadiene component of about 15% and a Tg of about −55° C.
[2]Natural rubber (cis 1,4-polyisoprene) having a Tg of about −70° C.
[3]Cis 1,4-polybutadiene rubber having a Tg of about −105° C.
[4]Except for the Control, a small particle size, high structure carbon black defined as SAF; (N-121); with a DBP value of about 132; and an iodine number of about 121. The carbon black for the control was a I-SAF carbon black (N-220); with a DBP value of about 114 and an iodine number of about 121.

The preferred carbon black is of the SAF (super abrasion furnace) type with an ASTM grade number of the N100 series. For the ASTM designation system, the N100 series reflects the smallest carbon black particle size with the ASTM number series increasing as the particle size increases with the largest particle size being in a higher series such as the N900 series.

A discussion of the types of carbon black and ASTM designations thereof may be found in The Vanderbilt Rubber Handbook (1978) pp 414–418.

The compounded rubber also contained conventional amounts of antidegradant of the paraphenylene diamine type, stearic acid, zinc oxide, sulfur and accelerator of the sulfenamide type.

EXAMPLE II

The prepared rubber compositions were cured at a temperature of about 150° C. for about 32 minutes and the resulting cured rubber samples evaluated for their physical properties as shown in the following Table 2. The samples A–D correspond to the samples A–D of Example I.

TABLE 2

| Properties | Ex. A | Ex. B | Ex. C | Ex. D (Control) |
|---|---|---|---|---|
| Tensile Strength (KPa) | 24.5 | 24.5 | 23.5 | 24 |
| Modulus (300%) | 13.0 | 12.9 | 14.0 | 11.5 |
| Elongation (%) | 480 | 485 | 470 | 535 |
| Hot Rebound (%) | 66 | 65 | 62 | 59 |

The hot rebound value is indicative of the resilience of the tread vulcanizate during tire service conditions and is determined by the Zwick Rebound Test at 100° C.

Observation of the physical properties of the rubber composite indicate that rubber composites A–C would provide enhanced properties in lower heat build-up, in particular, the hot rebound property.

EXAMPLE III

A pneumatic rubber tire was prepared having a rubber tread composed of the rubber composition of Experiment C. The tire was observed to have the following beneficial results: (i) good traction on wet roads as evidenced by wet skid rating results; (ii) lower heat build-up than a tire tread with the Control tread rubber under operational conditions; and (iii) good treadwear as evidenced by the results shown in the following Table 3 in which the results of the Control tire (C) are normalized to values of 100.

TABLE 3

| Tire Test Results | Exp. C | Control D |
|---|---|---|
| Wet Skid Resistance | 97 | 100 |
| Rolling Resistance | 110 | 100 |
| Heat Rise | 108 | 100 |
| Treadwear | 102 | 100 |

The wet skid resistance is determined by the breaking distance of a tire on surfaces with different friction coefficients where a higher value is considered better.

The rolling resistance value is determined on a resiliometer test machine by measuring the energy required to maintain the tire at a defined speed and where a higher value is considered better.

The heat rise value is determined by measuring the tire tread running temperature after a defined mileage under specified load conditions. A higher value is considered better.

The treadwear value is determined by a truck tire treadwear test under specified road and load conditions. A higher value is considered better.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a rubber tread where said tread rubber is comprised of, based on 100 parts by weight of the tread rubber, (1) about 20 to about 60 parts by weight S-SBR rubber having a styrene content of about 15 to about 25 percent and a vinyl content of less than 15 percent based on its butadiene component; (2) about 20 to about 60 parts by weight cis 1,4-polyisoprene natural rubber; and (3) about 10 to about 30 parts by weight cis 1,4-polybutadiene rubber; wherein the rubber blend is also required to contain about 45 to about 55 phr of a carbon black characterized by having a DBP value in a range of about 120 to about 140 (ASTM No. D2414) and an iodine adsorption number in a range of about 120 to about 160 (ADTM D1510) and an ASTM designated number in a range of N100 to N199.

* * * * *